United States Patent [19]

Forbes

[11] Patent Number: 5,003,587
[45] Date of Patent: Mar. 26, 1991

[54] TELEPHONE ON-HOLD DEVICE

[76] Inventor: Anthony Forbes, 6 Tamworth Way, Kardinya, Western Australia, Australia

[21] Appl. No.: 299,800

[22] PCT Filed: Jun. 29, 1987

[86] PCT No.: PCT/AU87/00187
§ 371 Date: Jan. 13, 1989
§ 102(e) Date: Jan. 13, 1989

[87] PCT Pub. No.: WO88/00418
PCT Pub. Date: Jan. 14, 1988

[30] Foreign Application Priority Data
Jun. 30, 1986 [AU] Australia ............................. PH6625

[51] Int. Cl.⁵ ............................................. H04M 1/00
[52] U.S. Cl. ................................. 379/393; 379/162; 379/163
[58] Field of Search ................... 379/67, 88, 162, 163, 379/395, 396, 393

[56] References Cited

U.S. PATENT DOCUMENTS

| | | | |
|---|---|---|---|
| 4,063,045 | 12/1977 | Greischer | 379/393 |
| 4,387,274 | 6/1983 | Stein et al. | 379/393 |
| 4,454,385 | 6/1984 | Grantland et al. | 379/393 |

FOREIGN PATENT DOCUMENTS 0276948 11/1988 Japan ................................... 379/393

Primary Examiner—Jin F. Ng
Assistant Examiner—Jhancy Augustus
Attorney, Agent, or Firm—Bachman & LaPointe

[57] ABSTRACT

A telephone on-hold device (10) for use with a telephone handset having a handpiece (18) with a mouthpiece (22) and an earpiece (16), the telephone on-hold device (10) comprising a switch (24) located in a housing (12), the housing (12) being dimensioned to receive at least the mouthpiece (22) of the handpiece (18) to actuate the switch (24), and an audio generation device (26) having an audio transducer (39) located in the housing (12) and arranged to be adjacent the mouthpiece (22), the switch (24) having a first switch component (24a) connected to actuate the audio generation device (26).

10 Claims, 2 Drawing Sheets

TELEPHONE ON-HOLD DEVICE

The present invention relates to a telephone on-hold device.

FIELD OF THE INVENTION

An "on-hold" condition is herein referred to as one where a person making an incoming telephone call is asked to wait whilst the person who answered said call momentarily leaves the telephone, for example, to make investigations to answer questions made by the person making said call and where said first mentioned person is substantially unable to overhear noise adjacent the answered telephone.

In large telephone installations an electronic on-hold device is provided to disconnect the mouthpiece of the answered telephone so that the person making the incoming call may not hear any sound generated adjacent the answered telephone.

In general, simple telephone installations do not comprise means to disengage the mouthpiece of the answered telephone and therefore the person making the incomming call may hear noise occuring adjacent to the answered telephone. It is, however, generally not preferred to allow the person making said call to be able to overhear whilst the person is in an on-hold condition.

Large telephone systems have the disadvantage of being costly and unsuited to home use or small businesses. Also, there are many telephone systems in use which do not have an on-hold facility. Also generally, prior are on-hold devices for telephones do not comprise means to allow the person making the call to gain the attention of the person who answered the call once placed on hold. The person on-hold must therefore wait for the other person to return to answer the telephone or hang up. The former has the disadvantage of waisted time and the latter has the disadvantage that the person on-hold is not able to leave a message. Such disadvantages are overcome by one form of message. Such disadvantages are overcome by one form of the present invention.

SUMMARY OF THE INVENTION

The present invention provides a telephone on-hold device to provide an on-hold facility to a telephone handset or a simple telephone installation.

In accordance with the present invention there is provided a telephone on-hold device for use with a telephone handset having a handpiece with a mouth piece and an ear piece, the telephone on-hold device characterised in that it comprises a switch means located in a housing, the housing being dimensioned to receive at least the mouth piece of the handpiece to actuate the switch means, and an audio generation means having an audio transducer located in the housing and to be adjacent the mouth piece, the switch means being disposed to actuate the audio generation means.

BRIEF DESCRIPTION OF THE DRAWINGS

The present invention will now be described by way of example with reference to the accompanying drawings, in which.

DESCRIPTION OF THE INVENTION

Figure 1:
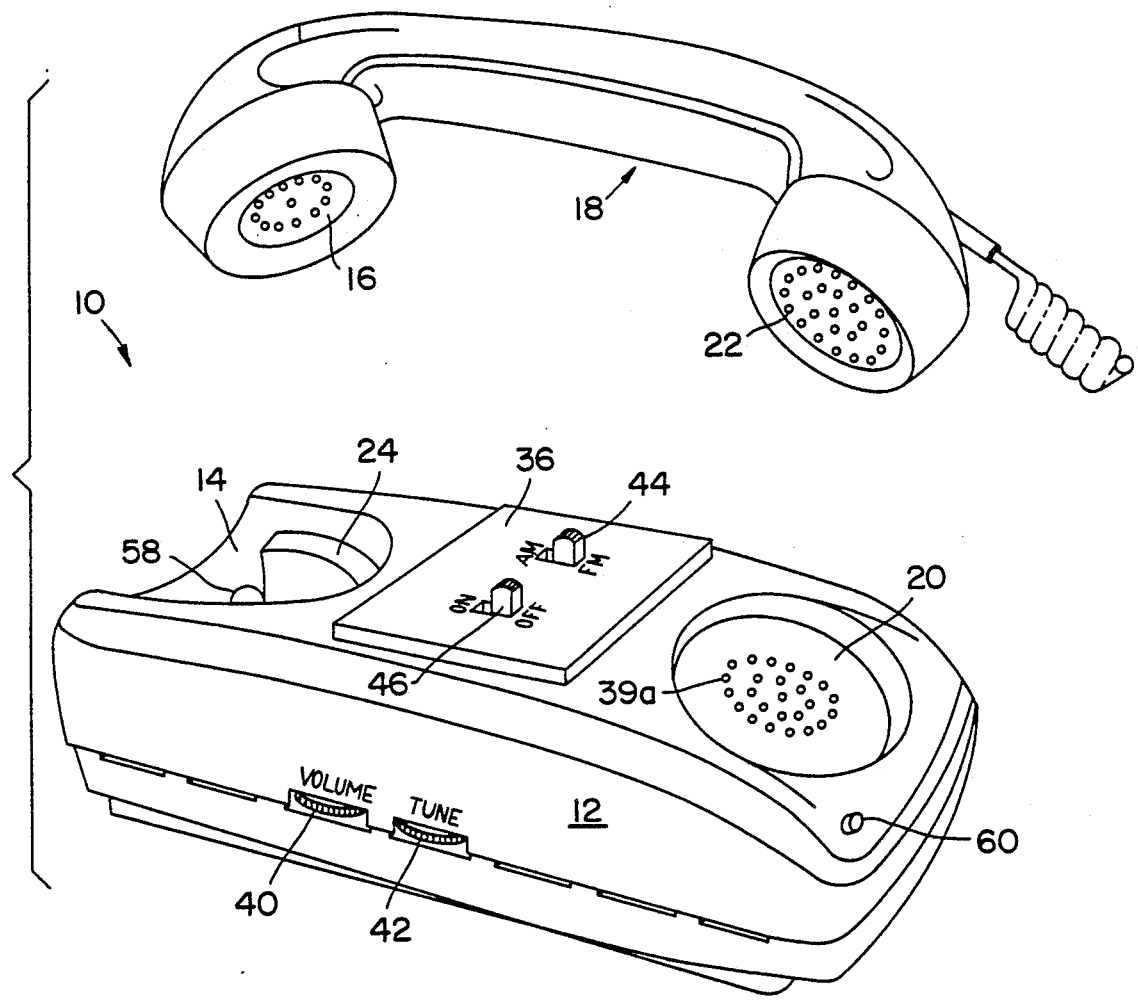
FIG. 1 is an upper perspective view of a telephone on-hold device in accordance with the present invention with a telephone handpiece shown about to be set thereon.

In FIG. 1 there is shown a telephone on-hold device 10 according to the present invention and comprising a housing 12.

In one form of the invention (as shown) the housing 12 comprises a first recess 14 dimensioned to receive an ear piece 16 of a handpiece 18 of a telephone handset (not shown). The housing 12 also comprises a second recess 20 spaced from the first recess 14 and dimensioned to receive a mouth piece 22 of the handpiece 18.

It is intended that the first recess 14 and the second recess 20 be so disposed relative to each other that the earpiece 16 be receivable by the first recess 14 whilst the mouthpiece is simultaneously receivable by the second recess 20.

The device 10 also comprises a switch means 24 located in the first recess 14 and arranged to be actuated by the earpiece 16. The switch means 24 may conveniently be in the form of a plunger commonly used in telephone handsets.

Figure 2:
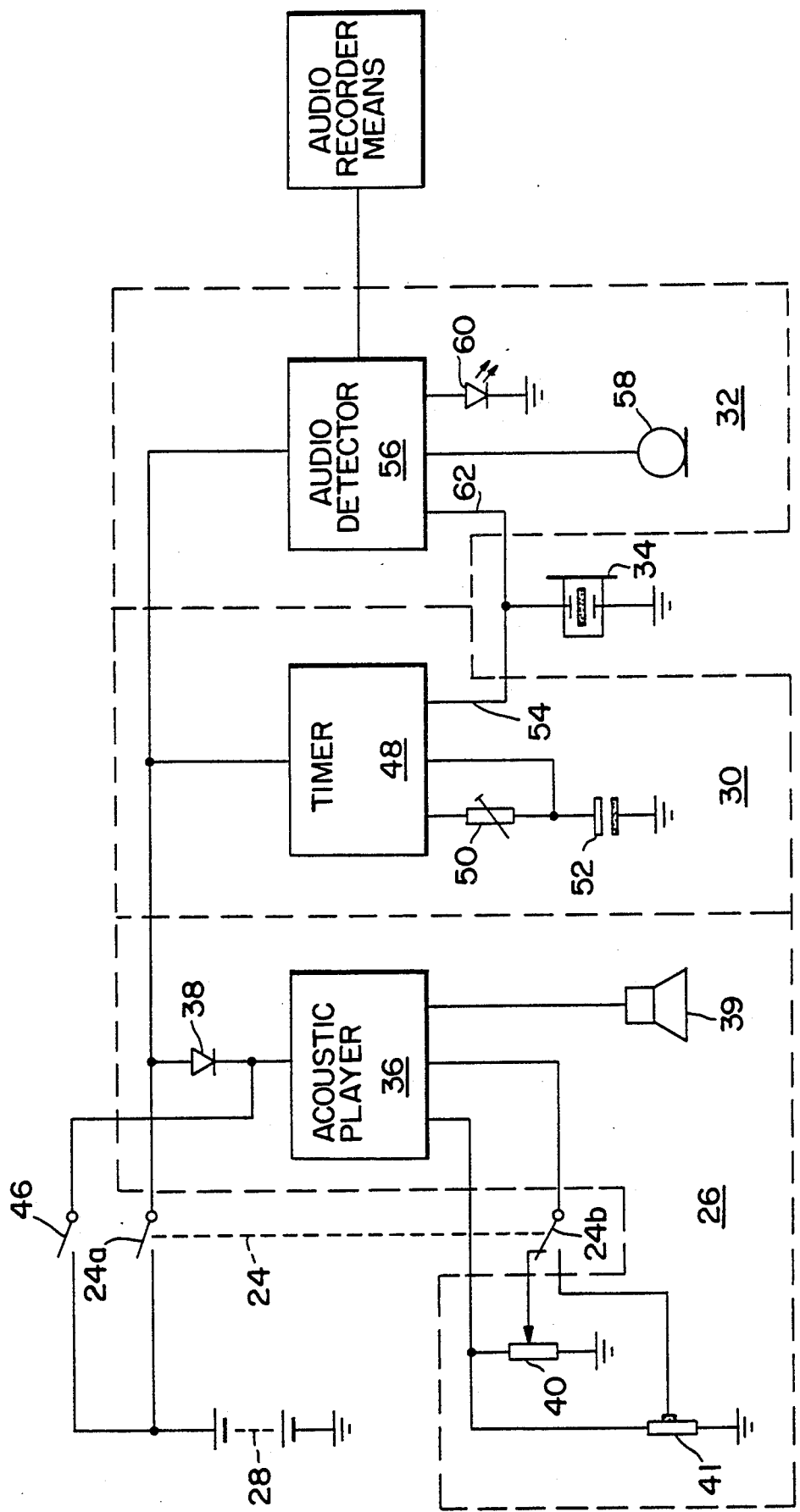
FIG. 2 is a block circuit diagram of the telephone on-hold device of FIG. 1.

In FIG. 2 there is shown a block circuit diagram comprising the switch means 24 and an audio generation means 26. The diagram also shows a source of electrical power, such as, for example, a DC battery 28. The diagram also shows a delay circuit 30 and a call back detector 32 each having an output connected to a common audio transducer, such as, for example, a buzzer 34.

The audio generation means 26 comprises an acoustic player 36, such as, for example, a radio or cassette player or electronic sound generator or the like. The acoustic player 36 is conveniently connected to the battery 28 via a diode 38 and a component 24a of the switch means 24.

The acoustic player is connected to a transducer, such as, for example, a loud speaker 39. The loud speaker 39 is located in the housing 12 adjacent the second recess 20. The second recess 20 comprises a plurality of holes 39a to allow sound to readily travel through the housing 12 to the mouthpiece 22.

The audio generation means 26 also comprises a first sound volume control means 40 connected to the acoustic player 36 via a switch component 24b of the switch means 24. The first sound volume control means 40 is preferably variable, such as, for example a variable resistor.

The switch components 24a and 24b are connected to be open circuit when the ear piece 16 is not placed in the recess 14 and to be closed circuit when the earpiece 16 is placed in the recess 14. Accordingly, the switch component 24a supplies the power from the battery 28 to the acoustic player 36.

The switch component 24b, when closed circuited connects a second sound volume control means, being a preset resistor 41 to the acoustic player 36 in place of the first sound volume control means 40. The switch component 24b therefore allows use of the acoustic player 36 to broadcast sound via the loud speaker 39 at a variable sound level about a room housing the device 10 when the handpiece 18 is not placed on the housing 12 and provides a preset sound volume level when the handpiece 18 is on-hold on the housing 12.

Where the acoustic player 36 is a radio it may also comprise a frequency tuning knob 42 and an AM/FM selection switch 44 such as of known type. The device 10 may also comprise an ON/OFF switch 46 connected to supply power from the battery 28 to the acoustic player 36 when the handpiece 18 is not placed on the housing 12.

The delay circuit 30 comprises a timer 48 and a resistor 50 and a capacitor 52 to produce an RC time constant. The timer 48 is connected to the battery 28 via the switch component 24a and begins to tune when the earpiece 16 is received by the first recess 14. The timer 48 is in the form of a monostable multivibrator whose time delay is set by the resistor 50 and the capacitor 52.

The timer 48 comprises an output 54 configured to be set active when the timer 48 has timed out its delay. The output 54 is connected to the buzzer 34 and thus provides an audio signal to the person answering the call to indicate that the person has been on-hold for a period of time exceeding a preset period.

The call back detector 32 comprises an audio detector 56 configured to detect acoustic energy. The audio detector 56 is connected to the switch component 24a and comprises a transducer, such as, for example, a microphone 58, an optional LED 60 and an output 62 connected to the buzzer 34. The microphone 58 is located in the recess 14 to receive sound from the earpiece 16 of the handpiece 18. The audio detector 56 is configured to set the output 62 active when the microphone 58 detects sound from the earpiece 16 at a sound pressure level above a preset level. Accordingly, the audo detector 56 may sound the buzzer and/or activate the LED 60 when the person on-hold speaks into his/her mouthpiece (not shown) which speech produces sound in the ear piece 16.

It is envisaged that the acoustic player 36 could be located outside of the housing 12. For example, an audio socket could be provided in the housing 12 to receive an audio output of the acoustic player 36. Accordingly, the resistors 41 and the variable volume control 40 could be connected to attenuate the audio signal received via the audio socket prior to delivery thereof to the loudspeaker 39.

It is envisaged that the telephone on-hold device 10 could be adapted for use with desk telephone handsets and/or wall telephone handsets.

It is envisaged that means could be provided to give a visual indication of the period of time that the switch means 24 has been activated.

In use the telephone on-hold device 10 of the present invention is installed adjacent one or more telephone handsets each comprising a handpiece 18 as described. The telephone on-hold device 10 need not be connected to the or each telephone handset. Conveniently the device 10 is powered by the battery 28 but other sources of DC power could be used, such as for example a DC supply derived from a mains power outlet.

The device 10 may be operated in two modes. In a first mode of operation the ON/OFF switch 46 is closed to supply power to the audio generation means 26. The diode 38 in such mode is reverse biased and the delay circuit 30 and the call back means 32 are not activated. In the first mode the sound volume output by the loudspeaker 39 is controlled by the first sound volume control means 40. The sound volume may be set to such level as to enable persons adjacent the device 10 to readily hear the sound. Therefore, in the first mode the device 10 acts as a radio receiver or casette player or the like.

When the handset 18 is placed onto the housing 12 with the earpiece 16 in the first recess 16 and the mouthpiece 22 in the second recess 20 the device 10 is in a second mode of operation.

In the second mode the switch means 24 is actuated by the weight of the earpiece 16 and closes the switch components 24a and 24b. The switch component 24a supplies power to the audio generation means 26 and the switch components 24b connects the second (preset) sound volume control means 41 to the acoustic player. The second volume control means 41 has a preset resistance to produce a second volume at a relatively low level so that the sound emenating through the holes 39a in the second recess 20 and to the mouthpiece 22 will be substantially similar to that of a person speaking into the mouthpiece 22 at a normal conversational level. The second control means 41 is provided to reduce the likelihood of the person who is on-hold from experiencing discomfort that could otherwise occur if the sound volume set by the first control means 40 were used in the second mode.

Further, in the second mode upon actuation of the switch means 24 the delay circuit is activated to time out a delay set by the time constant presented by the resistor 50 and the capacitor 52. The time constant may be between 30 seconds to 90 seconds for example. Once the delay circuit has timed out its delay the output is set active to sound the buzzer 34 to indicate that the person has been on-hold for a period of time set by the time constant. To deactivate the buzzer 34 the handpiece 18 may be lifted and may be replaced or the call may be answered.

If the person on-hold can not afford to wait any longer he or she may speak into the mouthpiece of the telephone handset which he or she is using. The sound of said speech is transmitted to the handpiece 16 and is received by the microphone 58 and detected by the audio detector 56 of the call back detector 32.

Where the detected sound exceeds a preset level the audio detector 56 sets the output 62 active to sound the buzzer 34. The sounded buzzer 34 indicates that the person does not wish to be on hold any longer and wishes, for example, to leave a message.

The LED 60 may be activated simultaneously with the output 62 to give a visual indication of the above. The device 10 is configured to switch between the first mode and the second mode as the switch means 24 is actuated and vice versa. Thus, sound from the loud speaker 39 is muted as soon as the handpiece 16 is set onto the housing 12 in the described manner.

In another form of the present invention the device 10 comprises only one recess (not shown). The recess comprises the switch means 24 and the holes 39a. In said another form the loud speaker is located adjacent the recess and interior of the housing 12.

The recess is dimensioned to receive the mouthpiece 22 of the handpiece 18 and the mouthpiece 22 actuates the switch means 24 in a manner similar to the earpiece 16. The said another form of the device 10 is otherwise substantially the same as described hereinbefore and in the drawings excepting that the call-back detector 32 is not provided since there is no recess located to receive the earpiece 16. however, it is to be understood that a microphone with a suction cup or the like could be used to be fixed to the earpiece 16 to allow the call-back detector 32 to be used.

In use the said another form of the device 10 operates as described hereinabove except that the mouthpiece 22 resides in the recess in the second mode.

By virtue of the present invention a cost effective telephone on-hold facility may readily be provided to a telephone handset without requiring modification of the handset.

Also by virtue of the call back detector the person on-hold may attract the attention of the person who answered the call, in order to leave a message. Otherwise, the person on hold must either continue to wait or hang up, neither of which is usually desirable. Further, the device 10 may sound an alarm to indicate that the person has been on-hold for a preset period of time.

Further, the device 10 may give a visual indication of the time period for which the person has been on-hold. It is to be noted that the time period could be greater than the preset period of time set by the resistor 50 and the capacitor 52.

Modifications and variations such as would be apparent to a skilled addressee are deemed within the scope of the present invention. For example, the delay circuit 30 could be configured to drive a video alarm, such as, for example, an incandescent globe. Also, the outputs of the audio detector 56, especially the output to the LED 60, could be latching outputs and reset by deactivation of the switch means 24. Further, the call back detector 32 could have a tape recorder connected to the output 62 and configured to record a message from the person on hold. Still further, an analogue or digital readout could be provided to indicate the frequency to which the radio is tuned.

I claim:

1. A telephone on-hold device for use with a telephone handset having a handpiece with a mouthpiece and an earpiece, the telephone on-hold device comprising a housing dimensioned to receive at least the mouthpiece of the handpiece, a recess in the housing dimensioned to receive the mouthpiece, an audio generation means having an audio transducer located in the housing and adjacent the recess to direct acoustic energy into the mouthpiece, and a switch means located in the housing and arranged to be activated by the weight of the handpiece thereon, the switch means having a first switch component connected to actuate the audio generation means.

2. A telephone on-hold device according to claim 1, in which the housing comprises a first recess dimensioned to receive an earpiece of the handpiece, and the recess constituting a second recess spaced from the first recess, the second recess comprising a plurality of holes and the first recess having at least part of the switch means disposed in it and arranged to be actuated by the weight of the earpiece thereon.

3. A telephone on-hold device according to claim 2, in which the audio generation means comprises an acoustic player connected to the audio transducer a first and second sound volume control means and a second switch component of the switch means connecting the acoustic player to the first and second sound volume control means, the second switch component being configured to connect the first sound volume control means to the acoustic player when the switch means is not actuated and configured to connect the second sound volume control means to the acoustic player when the switch means is actuated.

4. A telephone on-hold device according to claim 2, comprising a call back detector having an audio detector, a microphone connected to an input of the audio detector and an audio transducer connected to an output of the audio detector, the microphone being located in the first recess and arranged to receive audio signals from the earpiece, the audio detector being configured to detect the received audio signals and to sound the transducer accordingly.

5. A telephone on-hold device according to claim 2, comprising a delay circuit having a timer means to set a timing constant for the timer and an audio transducer connected to an output of the timer, the timer being configured to commence timing when the switch means is actuated and to sound the audio transducer when it has timed out.

6. A telephone on-hold device according to claim 2, comprising visual means connected to the switch means to give a visual indication of the period of time that the switch means has been actuated.

7. A telephone on-hold device according to claim 2, in which the audio generation means is a radio receiver.

8. A telephone on-hold device according to claim 2, in which the audio generation means is a tape cassette player.

9. A telephone on-hold device according to claim 2, in which the audio generation means is an electronic sound generator.

10. A telephone on-hold device according to claim 2, comprising a call back detector having an audio detector, a microphone connected to an input of the audio detector and an audio recorder means connected to an output of the audio detector, the microphone being located in the first recess and arranged to receive audio signals from the earpiece, the audio detector being configured to detect the received audio signals and to transmit them to the audio recorder means.

* * * * *